(12) United States Patent
McCurdy et al.

(10) Patent No.: US 10,710,037 B2
(45) Date of Patent: Jul. 14, 2020

(54) CHEMICAL MIXING SYSTEM AND METHOD

(71) Applicant: DuBois Chemicals, Inc., Sharonville, OH (US)

(72) Inventors: Brent McCurdy, Bryn Athyn, PA (US); Michael Maurizi, Bristol, PA (US)

(73) Assignee: DuBois Chemicals, Inc., Sharonville, OH (US)

( * ) Notice: Subject to any disclaimer, the term of this patent is extended or adjusted under 35 U.S.C. 154(b) by 557 days.

(21) Appl. No.: 14/674,855

(22) Filed: Mar. 31, 2015

(65) Prior Publication Data

US 2015/0202580 A1    Jul. 23, 2015

Related U.S. Application Data

(62) Division of application No. 13/099,086, filed on May 2, 2011, now abandoned.

(51) Int. Cl.
*B01F 15/00* (2006.01)
*B01F 15/02* (2006.01)
(Continued)

(52) U.S. Cl.
CPC .......... *B01F 15/0248* (2013.01); *B01F 3/088* (2013.01); *B01F 3/0865* (2013.01); *B01F 5/0413* (2013.01); *B01F 5/0428* (2013.01); *B01F 5/0496* (2013.01); *B01F 13/1019* (2013.01); *B01F 15/0035* (2013.01); *F16L 37/244* (2013.01); *G05D 11/006* (2013.01); *B01F 2003/0896* (2013.01); *B01F 2215/004* (2013.01); *B01F 2215/0036* (2013.01);
(Continued)

(58) Field of Classification Search
CPC .................. B01F 15/0248; B01F 3/088; B01F 203/0896; B01F 3/065
USPC ...................................... 366/163.2
See application file for complete search history.

(56) References Cited

U.S. PATENT DOCUMENTS

2,080,872 A *  5/1937  Paterson .......................... 137/9
3,857,409 A * 12/1974  Aubrey et al. ................. 137/412
(Continued)

*Primary Examiner* — Anshu Bhatia
(74) *Attorney, Agent, or Firm* — Riverside Law LLP (57) ABSTRACT

A chemical component mixing apparatus for use with a fluid source in creation of a concentrated solution mixture is described. The mixing apparatus includes at least one mixing station. The mixing station includes an injector assembly, where the injector assembly includes at least one venturi chamber having at least one suction port in fluid communication with the at least one venturi chamber. The apparatus also includes at least one super concentrate chemical component housed within a chemical container, where the chemical container is fluidly connected by a first tube to the at least one venturi chamber via the at least one suction port, a receiving container fluidly connected to the injector assembly via a second tube, and a fluid source inlet introducing a fluid into the at least one mixing station, where the pressure within the at least one mixing station is less than 150 psi. The fluid passes through the at least one venturi chamber, thereby drawing the at least one super concentrate chemical component into the venturi chamber, and the concentrated solution mixture is dispensed from the injector assembly into the receiving container.

15 Claims, 6 Drawing Sheets

(51) Int. Cl.
    *B01F 5/04*          (2006.01)
    *B01F 3/08*          (2006.01)
    *B01F 13/10*        (2006.01)
    *F16L 37/244*      (2006.01)
    *G05D 11/00*       (2006.01)
    *C02F 1/42*          (2006.01)
    *C02F 1/48*          (2006.01)
    *C02F 5/08*          (2006.01)

(52) U.S. Cl.
    CPC ......... *B01F 2215/0468* (2013.01); *C02F 1/42* (2013.01); *C02F 1/48* (2013.01); *C02F 5/08* (2013.01)

(56) References Cited

U.S. PATENT DOCUMENTS

| | | | | |
|---|---|---|---|---|
| 4,058,296 | A * | 11/1977 | Wetherby | 137/890 |
| 4,087,881 | A * | 5/1978 | Bates | 15/422.2 |
| 4,171,710 | A * | 10/1979 | Boynton et al. | 137/238 |
| RE30,610 | E * | 5/1981 | Gacki et al. | 366/153.1 |
| 5,439,020 | A * | 8/1995 | Lockhart | 137/3 |
| 5,655,713 | A * | 8/1997 | Gibney et al. | 239/310 |
| 5,678,593 | A * | 10/1997 | Lockhart | 137/268 |
| 6,193,893 | B1 * | 2/2001 | Mazzei et al. | 210/702 |
| 2005/0185505 | A1 * | 8/2005 | McCurdy et al. | 366/153.1 |
| 2007/0036024 | A1 * | 2/2007 | Kubala et al. | 366/163.2 |
| 2007/0084515 | A1 * | 4/2007 | Kimsey | 137/890 |
| 2009/0090415 | A1 * | 4/2009 | Harris et al. | 137/7 |

* cited by examiner

CHEMICAL MIXING SYSTEM AND METHOD

CROSS-REFERENCE TO RELATED APPLICATIONS

This application is a divisional application of U.S. non-provisional application Ser. No. 13/099,086 filed on May 2, 2011, incorporated herein by reference in its entirety.

BACKGROUND OF THE INVENTION

Venturi injectors are commonly used to introduce a secondary fluid into a primary fluid stream. These injectors include an inlet for a primary fluid flow, a suction port introducing a second fluid flow into the primary fluid flow path, and an outlet for dispensing the combined primary and secondary fluids.

Systems for mixing chemical components using a venturi are well known in the art. For example, U.S. Pat. Nos. 5,439,020 and 5,678,593 describe detergent mixing systems for use with a highly pressurized water source. These systems include a mixing tank and several liquid chemical supply containers each accommodating a liquid chemical composition. A water supply conduit connects the pressurized water source with the mixing tank. Venturi chambers are disposed within the water supply conduit and are arranged for parallel flow. Each of the venturi chambers includes a suction port in fluid communication, respectively, with one of the liquid chemical supply containers so as to draw the liquid chemical from each chemical supply container as pressurized water passes through the venturi chamber, thus entraining the liquid chemical into the water.

In another example, U.S. Patent Application Publication No. 2009/0090415 describes an ultra-high pressure chemical delivery system sharing a common bulk fluid inlet and bulk fluid flow path to direct a bulk fluid through injectors. The system includes a manifold body having a bulk fluid inlet fluidly interconnected to a plurality of injector flow channels. Each injector flow channel includes a valve conduit and an injector conduit. The valve conduits include a valve mounting port and the injector conduits include an injector mounting port. The injector members each include a chemical inlet portion and a mixed fluid outlet portion, where the valve member selectively directs the bulk fluid through the injectors for drawing a chemical through the inlet portion for mixing with the bulk fluid and dispensing through to a point of use through the mixed fluid outlet portion. This system is specifically designed for use of extremely high water pressures upwards of 1000 psi.

In either case, the aforementioned systems are designed for creation of final use-level or application-level diluted solutions, that are no longer concentrated, such as dilutions of 1:20, 1:50, 1:100 or 1:500 (chemical to water). For creation of higher concentrated solution mixes (such as solutions having concentrations of greater than 1:5) from super concentrates, a highly controlled and delicate mixing environment is needed. Because the aforementioned systems require water under high pressure flows through the venturi chamber, these systems are not suitable for creation of higher concentrated solution mixes.

Further, these systems require a thorough understanding of the underlying mechanical functionality of multiple venturis operating in parallel or in series, and their effects on mixing, in order to operate the equipment effectively. Unfortunately, these systems do not provide a straight forward, ease-of-use platform and interface, as is highly desired by chemical mixing station operators.

Therefore, there is a need in the art for a system and method for creating concentrated chemical solution mixes from super concentrates, designed for simple operation by a user. The present invention satisfies this need.

SUMMARY OF THE INVENTION

The present invention relates to a chemical component mixing apparatus for use with a fluid source in creation of a concentrated solution mixture. The mixing apparatus includes at least one mixing station. The mixing station includes an injector assembly, where the injector assembly includes at least one venturi chamber having at least one suction port in fluid communication with the at least one venturi chamber. The apparatus also includes at least one super concentrate chemical component housed within a chemical container, where the chemical container is fluidly connected by a first tube to the at least one venturi chamber via the at least one suction port, a receiving container fluidly connected to the injector assembly via a second tube, and a fluid source inlet introducing a fluid into the at least one mixing station, where the pressure within the at least one mixing station is less than 150 psi. The fluid passes through the at least one venturi chamber, thereby drawing the at least one super concentrate chemical component into the venturi chamber, and the concentrated solution mixture is dispensed from the injector assembly into the receiving container.

In one embodiment, the pressure within the at least one mixing station is between 10-50 psi. In another embodiment, the pressure within the at least one mixing station is between 15-40 psi. In another embodiment, the apparatus further includes a pump. In another embodiment, the apparatus further includes a water softener. In another embodiment, the injector assembly includes a multi-port injector. In another embodiment, the first tube is ½ inch tubing. In a further embodiment, the ½ inch tubing is connected to an adapter for releasably securing the ½ inch tubing to the at least one suction port of the at least one venturi chamber. In another embodiment, the ½ inch tubing contains a metering tip within the tubing for at least partially restricting flow of the chemical component housed in the chemical container into the injector assembly. In another embodiment, the at least one mixing station further includes a pressure regulator. In another embodiment, the at least one mixing station further includes a valve upstream of the pressure regulator. In another embodiment, the at least one mixing station further includes a float positioned at least partially within the receiving container. In another embodiment, the at least one mixing station further includes a circuitry hub electrically connecting the float to the valve. In another embodiment, the valve is a water solenoid valve. In another embodiment, the float signals the valve to cease flow of the fluid through the mixing station when the receiving container is filled with a predetermined amount of the concentrated solution mixture dispensed from the injector assembly. In another embodiment, the electrical connection of the float to the circuitry hub comprises an adapter cord. In another embodiment, the at least one mixing station is a plurality of mixing stations, and the adapter cord connects multiple circuitry hubs of the multiple mixing stations to a single float at least partially within a single receiving container. In another embodiment, the single float signals the valve of each of the multiple mixing stations to cease flow of the fluid through the mixing stations when the receiving container is filled with a predetermined amount of the concentrated solution mixture.

The present invention also relates to a method for mixing a concentrated chemical solution. The method comprises the steps of receiving a base fluid flow into a mixing station having an injector assembly that includes at least one venturi chamber having at least one suction port in fluid communication with the at least one venturi chamber, regulating the pressure of the base fluid flow to less than 150 psi, providing a source of at least one liquid chemical component in fluid communication with the injector assembly via a first tube, providing a receiving container for collection of the final concentrated chemical solution that is in fluid communication with the injector assembly via a second tube, mixing the at least one chemical component with the base fluid in the at least one venturi chamber to create the concentrated chemical solution, wherein flow of the base fluid through the at least one venturi chamber of the injector assembly draws the at least one liquid chemical component through the at least one suction port and into the flow of the base fluid, and dispensing the concentrated chemical solution into the receiving container.

The present invention also relates to an adapter for connecting a tube to a venturi-style injector. The adapter comprises a housing having a hollow interior, the housing comprising an inlet and an outlet to the hollow interior, a first attachment mechanism for attaching a tube to the inlet, and a second attachment mechanism for attaching the outlet to a suction port arm of a venturi-style injector, where the second attachment mechanism includes a notch pattern sized and shaped to receive a reciprocal knob pattern forming part of the arm of the injector when the adapter is pressed onto the injector arm, and wherein, upon passage of the knob pattern through the notch pattern, the adapter can be twisted, such that the notch patter rotates away from the knobs and releasably locks the adapter onto the injector.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

DETAILED DESCRIPTION

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Concentrated Solution" as used herein means a solution having a total chemical to water concentration ratio of greater than about 1:5. The meaning of "total chemical" refers to the total amount of a single chemical component or a combination of multiple chemical components admixed into a water volume.

"Super concentrated solution" as used herein means a solution having a total chemical to water concentration of greater than the desired concentrated solution being created therefrom.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

DESCRIPTION

It is to be understood that the figures and descriptions of the present invention have been simplified to illustrate elements that are relevant for a clear understanding of the present invention, while eliminating, for the purpose of clarity, many other elements found in typical chemical mixing systems and the methods of manufacturing and using the same. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. Therefore, the disclosure herein is directed to all such variations and modifications to such elements and methods as would be understood by those skilled in the art. Furthermore, the embodiments identified and illustrated herein are for exemplary purposes only, and are not meant to be exclusive or limited in their description of the present invention.

The present invention provides a unique and valuable system and method for shipping and delivering super concentrated chemical components to an end-user who can simply and consistently create a desired concentrated solution for use with application-level delivery systems to further create application-level mixed dilutions on-site. The present invention thereby bypasses the need for increased packaging and shipment costs to distributors or operators worldwide. After installation of the mixing apparatus of the present invention at the distributor or operator location, super concentrate chemical components can be packaged and shipped at lower costs to the distributor or operator, who then operates the mixing apparatus of the present invention to make concentrated solutions, which are in turn used with application-level systems for delivering application-level dilutions. Generally, the mixing apparatus merely requires the hook up of pre-set venturis with a lock and release mechanism, a one-push button for activation of the system, and the resulting mixture will be automatically made and dispensed into a desired container. This process allows anyone to become their own blender and sell a product of the desired concentration to local customers or for internal use. As contemplated herein, the present invention can make any chemical solution mix from a concentrate for any application in any chemical industry.

Unlike existing systems which use injectors only for the purpose of creating solutions at application level concentrations, the present invention utilizes injectors to create concentrated equivalents of market strength concentrates from super concentrates.

The present invention may generally be described as a chemical mixing system for the creation of mixed liquid solutions of various concentrations from higher concentrated liquid chemical components. As contemplated herein, the concentrated solutions created by the present invention may have total chemical to water concentration ratios of greater than about 1:5, greater than about 1:4, greater than about 1:3, greater than about 1:2, and even about 1:1, and any whole or partial ratios therebetween.

In one embodiment, the present invention may be used for creating concentrated, multi-component liquid detergent solutions for use at a car wash. Of course, the mixing apparatus of the present invention may be positioned at any location, such as at a car wash detergent distributor or merchant retail facility, or at an automated car wash facility, where a detergent solution of predetermined concentration is required. Depending on the location and/or desired use of the resulting mixed solutions, the mixing apparatus of the present invention can be programmed to create the desired concentration level of the desired mixed solution. For example, a detergent distributor may want to create concentrated mixed solutions of higher concentrate components, whereas a car wash operator may want to create a finished solution of application-strength concentration. The present invention may be used to mix any number and any type of liquid based (or otherwise substantially fluid) materials suitable for passage through a hose and manifold assembly, including all chemical and detergent/cleaning components, and any other liquid chemicals designed for industrial or retail use. Without limitation, such chemical components include all those used in the car wash, bus wash, train wash, airplane wash and in the general washing, rinsing and coating applications of vehicles and equipment in the transportation industry.

Figure 1:
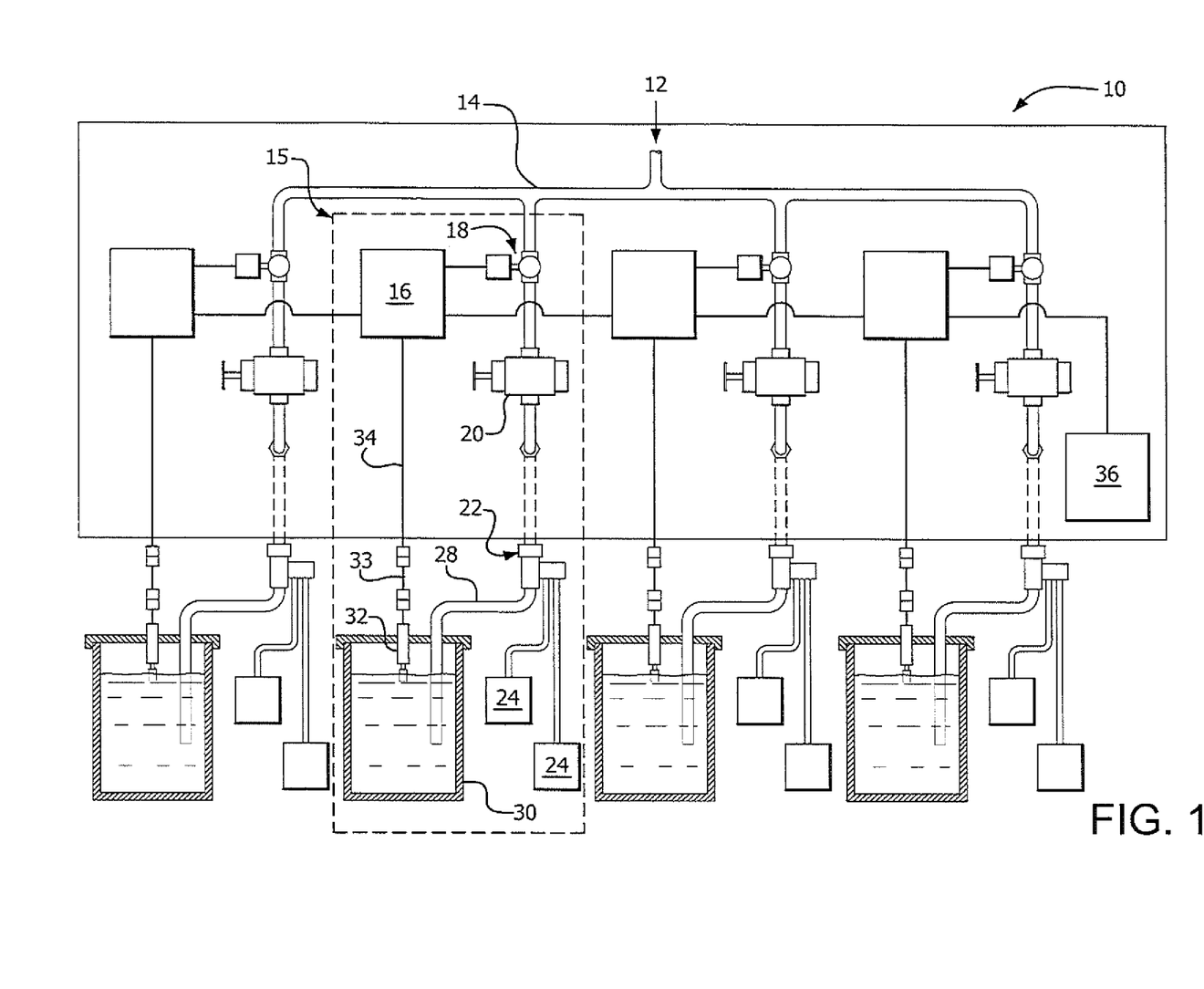
FIG. 1 is a schematic back view of an exemplary chemical mixing apparatus in accordance with the present invention.
Figure 2:
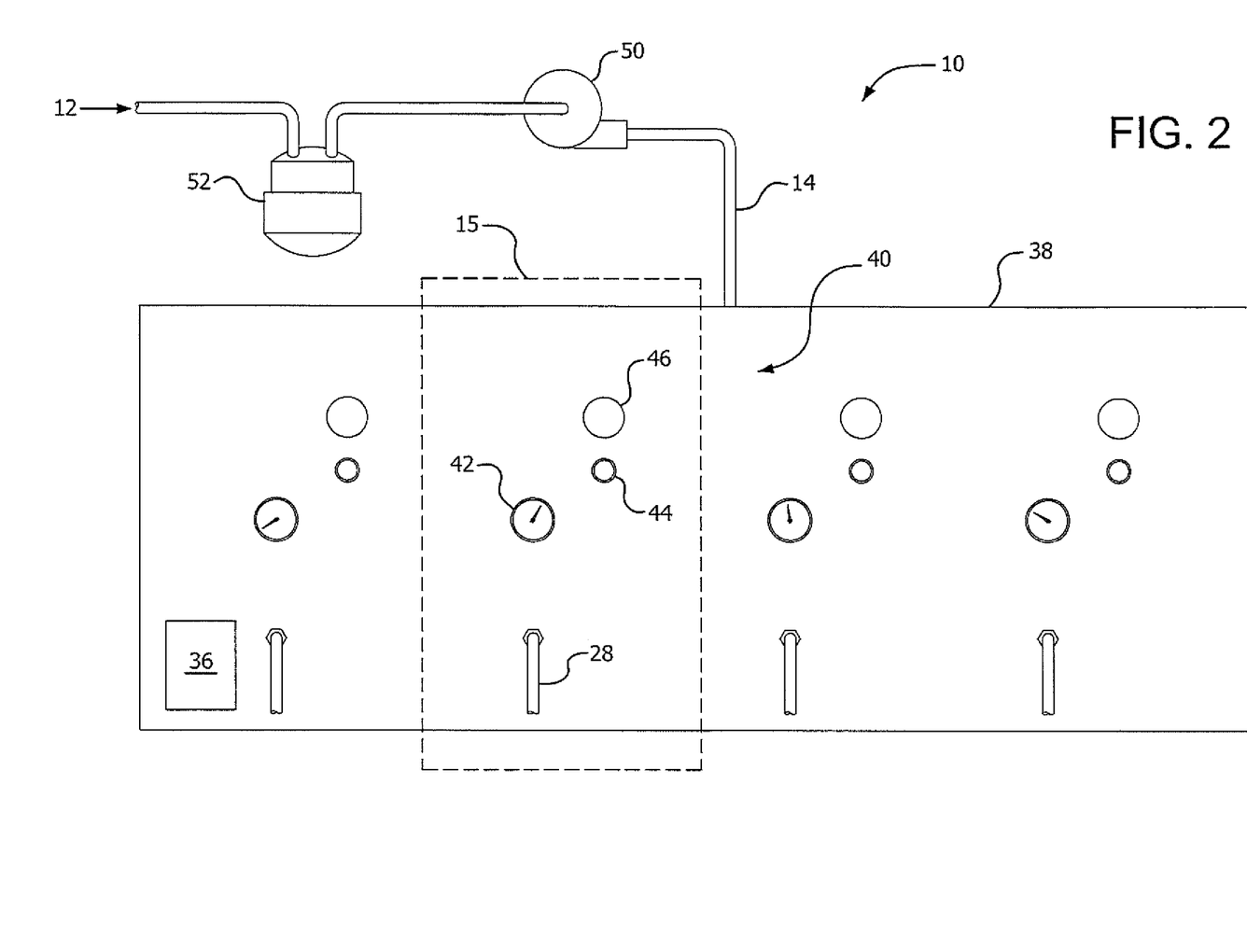
FIG. 2 is a schematic front view (or operating face) of the exemplary chemical mixing apparatus of FIG. 1, in accordance with the present invention.

As illustrated herein, FIG. 1 represents a back view of an exemplary mixing apparatus of the present invention, while FIG. 2 represents a front view, or interface of the exemplary mixing apparatus. As contemplated herein, the mixing apparatus may be constructed as a stand-alone assembly having a basic frame with front and back sides that are easily accessible by a user. Alternatively, the mixing apparatus may be integrated into a facility wall, where a customer is limited to access to the front side for receiving the mixed solution, and an operator or facility owner has access to the back side and various equipment components. In another embodiment, the components of the mixing apparatus may be enclosed or secured within a housing. Of course, it should be appreciated that there is no limitation as to whether a particular component of the mixing apparatus be on the front face, or user operating side, or the back face, which is typically hidden from view but still accessible by a user.

According to an aspect of the present invention and as shown generally in FIG. 1, mixing apparatus 10 includes any number of mixing stations, where a mixing station is depicted generally as including some or all of the components within dashed line box 15. For example, as illustrated in FIG. 1, apparatus 10 includes four mixing stations, where each mixing station includes a feed from water manifold line 14, water solenoid valve 18, electrical circuitry hub 16 electrically connecting a float 32 to water solenoid valve 18 via float adapter cord 33 and power line 34, pressure regulator 20, injector assembly 22, super concentrate liquid chemical component containers 24 and delivery tubes 26 for drawing the super concentrate chemical components of containers 24 into injector assembly 22, and dispensing tube 28 for dispensing the final concentrated solution mixture into a receiving container 30. As contemplated herein, float 32, water solenoid valve 18 and pressure regulator 20 may be standard, commercially available floats, water valves and pressure regulators as would be understood by those skilled in the art.

Electrical box and circuitry 36 is a main switch for providing power to mixing apparatus 10. Each mixing station 15 is individually fed by a manifold assembly 14, delivering a water flow 12 into each mixing station 15. While water is generally used as a base fluid for flow 12, it should be appreciated that any liquid component can form the base fluid in flow 12 to be mixed within each mixing station. For example, a diluted, concentrated or even super concentrate liquid solution may form the base fluid. In certain embodiments, a hose from container 30, or from an additional overflow container in fluid communication with container 30 (not shown), can also be in fluid communication with the base fluid flow line (incorporating any additional valves, junctions and/or pressure regulators) to create a "feedback" flow pattern, where the resulting concentrated solution dispensed from injector assembly 22 is being re-fed back into the venturi of injector assembly 22 as the base fluid. By using this sort of system design, total chemical to water solution concentrations of approximately 1:1 can be reached.

Receiving container 30 may be any size container, such as a 1 gallon, 5 gallon, 6 gallon, 30 gallon, 55 gallon, or any size container imaginable. Receiving container 30 may be fabricated from any material suitable for storing or transporting liquid chemical compositions. Container 30 may also include a lid suitable for closing and sealing the resultant mixed solution within container 30. Depending on the type of final solution mixture, the lid may also include a venting feature to allow airflow. As described herein, the float 32 may be integrated into such a lid, or may be separately attachable or passable through the lid.

Tubing 26 and 28 may be manufactured from any standard material resistant to the chemical components passing through them in the operation of mixing apparatus 10. Tubing 26 and 28 are preferably flexible, but this is not required. Chemical delivery tubes 26 attached to adapter 62 are preferably ½ inch or larger tubing (instead of the standard ¼ inch tubing used in existing systems). Surprisingly, it was discovered that ½ inch or larger tubing for delivery tubes 26 provided significantly improved flow over smaller tubing, due in part to reduced resistance. This significantly improved the chemical draw and mixing environment within the venturi chamber of the injector assembly 22. To accomplish this, a specialized adapter 62 had to be created. This is due in part to the fact that existing venturi style injectors are designed for creation of significantly diluted solutions under high pressure, and can tolerate the higher resistance of ¼ inch tubing. In contrast to this traditional use of venturis and as demonstrated herein, it has been discovered that the higher the concentration of chemical component and higher concentration of final solution mixture, the more critical the tubing size (in conjunction with lower pressure ranges, as later described herein). In the creation of selected concentrated solutions, only by use of ½ inch or larger tubing was the creation of such solutions successful.

Circuitry hub 16 includes standard components and configurations for receiving and sending electrical signals as would be understood by those skilled in the art. In alternative embodiments, circuitry hub 16 may further include one or more processing units, as well as wired or wireless communication components, to input and/or actuate user input for mixing apparatus 10.

The water solenoid valve 18 may be used to control the flow of pressurized water or base fluid 12 from manifold assembly 14. The valve 18 may be actuated by the motion of a float 32 suspended within container 30, or integrated with a lid for container 30. Valve 18 and float 32 are electrically connected via a float adapter cord 33 and power line 34 controlled by circuitry hub 16. When a user activates the fill switch (turning the mixing station on), water flows from manifold assembly 14 through valve 18, pressure regulator 20, combined with chemical components at injector assembly 22 and dispensed into receiving container 30. When there is no liquid solution in receiving container 30, the fluid sensing float switch contacts are closed, creating an activated relay. Once the fluid level in receiving container 30 reaches a predetermined level, the float switch opens and unlatches the relay, thereby closing valve 18 and ultimately stopping flow into receiving container 30. Once the relay is unlatched, valve 18 remains closed regardless of the position of float 32, such that a user can safely remove and replace receiving container 30 with a new or empty one at a comfortable and variable speed. The switch may then be reset to allow for the opening of valve 18 to start the process again when the user is ready. Thus, the use of a float to cease the system from filling automatically can be designed into a certain container size for accurate and automatic flow cessation.

Additionally, the float adapter cord 33 allows a user to automatically change out for various container sizes easily and quickly, without disturbing power line 34 leading into circuitry hub 16. Each end of float adapter cord 33 includes an electrical attachment component, as would be understood by those skilled in the art, for electrically connecting or bridging float 32 with power line 34. In certain embodiments, float adapter cord 33 may include multiple attachment components for connecting a single float to multiple power lines 34 extending from multiple mixing stations 15. For example, if a user desires to increase the rate of filling a large (55 gallon) receiving container with a concentrated chemical solution mix, the user can place dispensing tubes 28 from each mixing station into the 55 gallon container, and activate two or more mixing stations in unison by hooking up a float adapter cord 33 having one float attachment and two or more corresponding power line 34 attachments, such that when the user activates each of the mixing stations, each of the mixing stations automatically shut off in parallel when float 32 signals the relay to unlatch. It should be appreciated that the float adapter cords, as contemplated herein, can have any number of line 34 attachments as desired, all connecting to a single float 32.

It should be appreciated that any number of mixing stations 15 may be incorporated into mixing apparatus 10. Additionally, and as previously described, any number of mixing stations 15 may be combined, such that multiple mixing stations 15 may be used to speed up mixing and production of a final chemical solution mixture into a single or smaller number of larger receiving containers 30.

FIG. 2 depicts the front face, or operational side, of mixing apparatus 10. As shown in FIG. 2, water flow 12 entering manifold assembly 14 may also include a water softener 52, as well as a pump 50 for increasing water pressure throughout mixing apparatus 10. Water softener 52 and pump 50 may be any standard and commercially available water softener and pump as would be understood by those skilled in the art. For example, water softener 52 may be any softening or treatment system, including magnetic softening or an ion exchange system. In some embodiments, use of a water softener may result a more stable mixed solution. It should be appreciated that neither water softener 52 nor pump 50 are required for operation of mixing apparatus 10. In particular, because mixing apparatus 10 may operate at surprisingly low pressure levels, water flow 12 may already have sufficient pressure for mixing concentrated solutions within each mixing station 15. This front face also serves as a user interface 38 for operation of mixing apparatus 10. As illustrated in FIG. 2, interface 38 includes, for each mixing station 15, a pressure gauge 42, an activation signal 44, a one-push activation button 46, and dispensing tube 28 leading to receiving container 30. Interface 38 also includes system power on/off panel 36 (corresponding to electrical box 36 of FIG. 1). While the user interface 38 of FIG. 2 is designed for a simple, ease of use operation, user interface 38 may include any number of additional components, such as additional data input keys for adjusting pressure, menu buttons for any number of pre-set final solution mixtures, receiving container 30 sizes, etc., and any other visual/audio components as might be desired, such as a help or call function to a facility manager.

Figure 3:
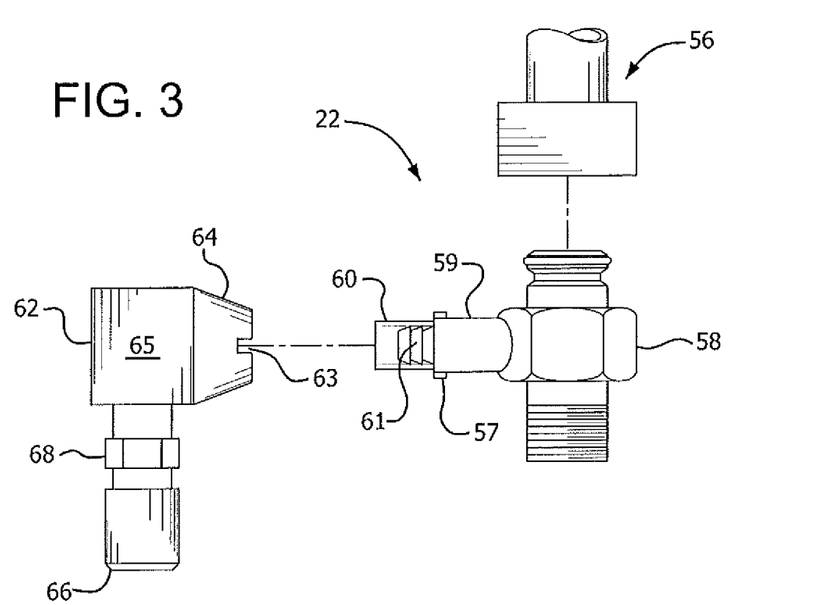
FIG. 3 is a schematic of an exemplary injector assembly, including an injector, fitting and line adapter, in accordance with the present invention.

FIG. 3 depicts a close-up of injector assembly 22. As shown in FIG. 3, injector assembly 22 includes an injector 58, an optional fitting 60, a manifold assembly 14 attachment mechanism 56, and chemical line adapter 62. In one embodiment, injector 58 is a standard, commercially available injector as would be understood by those skilled in the art. In alternative embodiments, injector 58 may be designed to be directly and sealed by ½ inch or larger tubing to create fluid communication with a super concentrate chemical source, thereby removing the necessity of adapter 62 and/or fitting 60. When used, fitting 60 may be cut tubing, an O-ring or any other component improving the attachment and sealing of adapter 62 to injector 58.

Adapter 62 has an internal chamber (illustrated in FIG. 7) which passes through an inlet 66 that engages delivery tube 26, an arm 68 extending to adapter head 65, which adapter head 65 includes an injector arm attachment portion 64 having a notch pattern 63 that reciprocally corresponds to the same size and shape of injector knob pattern 57. Attachment portion 64 is uniquely designed to securely and releasably engage, lock and seal adapter 62 to injector 58, such that chemical components drawn from containers 24 can be in fluid communication with the water flow passing through injector 58.

Injector 58 generally includes a molded body having an inlet for receiving flow of a base fluid, a chemical inlet arm for introduction of a flow of a liquid chemical component, and an outlet for dispensing resultant mixed solution. Injector 58 is generally designed for insertion and/or sealed coupling with a hose, tube or line assembly to receive, feed and dispense liquid flow as understood by those skilled in the art. For example, the injector inlet and/or outlet may include a hose barb, a flare fitting, or a quick-release configuration.

Figure 4:
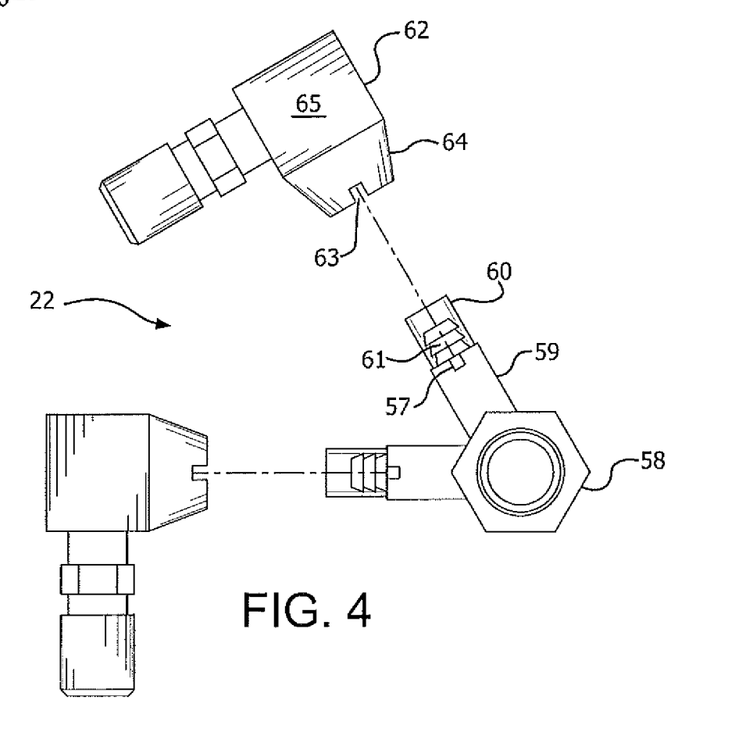
FIG. 4 is a schematic top view of an exemplary multi-arm injector assembly, in accordance with the present invention.

As shown in FIG. 3, injector 58 has a single arm 59 to which adapter 62 attaches for fluidly connecting a chemical flow from chemical component containers 24 into the water flow from manifold assembly 14. Injector arm 59 includes a knob pattern 57 in addition to a barbed tube attachment end 61. In alternative embodiments, injector 58 can include multiple arms 59 for combining a plurality of chemical components from a plurality of containers 24 into a single fluid flow. For example, FIG. 4 illustrates an injector 58 having two such arms 59. It should be appreciated that the injectors of the present invention may include any number of arms, provided that the venturi chamber within injector 58 maintains functionality and effectively draws each of the concentrated chemical components as desired.

Figure 7:
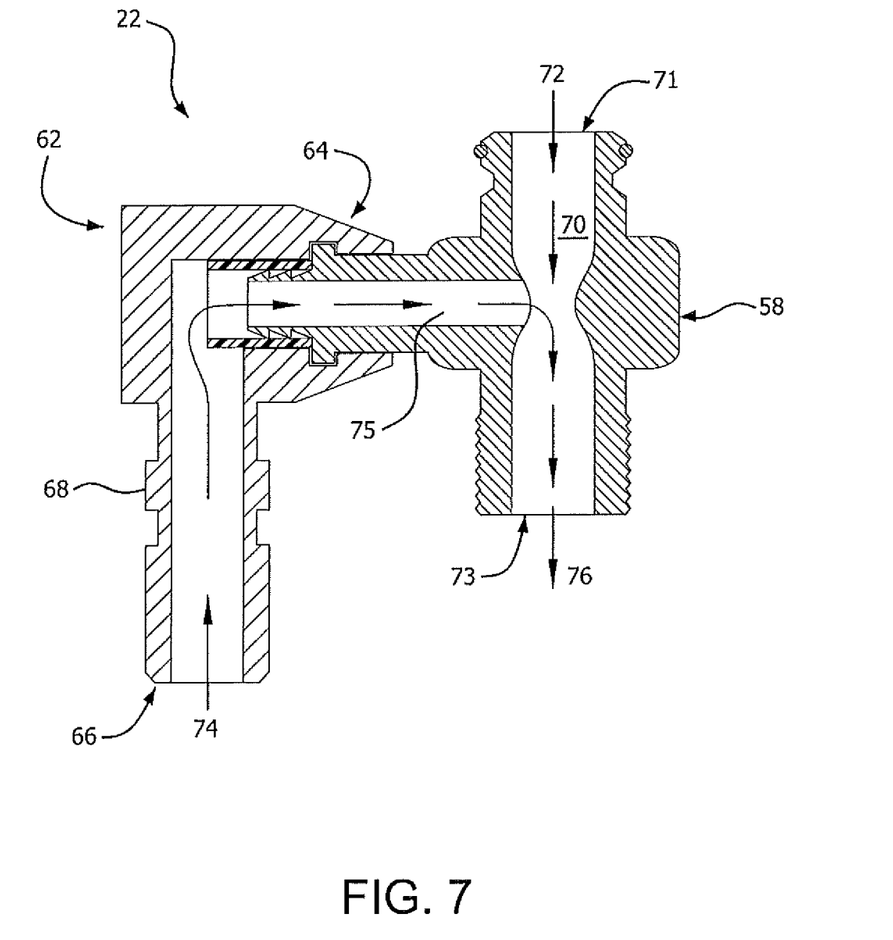
FIG. 7 is a cross-sectional view of the injector assembly of FIG. 5, illustrating directional flow through the venturi chamber and introduction of a second flow of a chemical component through the line adapter, injector arm and first flow within the venturi chamber.

Injector 58 includes an internal venturi chamber 70, seen in FIG. 7, defining a flow passage from the inlet 71 to the outlet 73 thereof. A suction port 75 through the injector arm 59 provides lateral access to the venturi chamber 70. By means of chemical line adapter 62 removably engaging the injector arm, a fluid transfer conduit is created, extending all the way from chemical component containers 24, such that the chemical component is in fluid communication with the injector assembly 22. In an embodiment such as illustrated in FIG. 4 (multi-port injectors), each chemical component is in fluid communication with injector assembly 22. In operation, the base fluid flow 72 through venturi chamber 70 creates a draw through suction port 75, thereby drawing the chemical component from containers 24 into a flow 74 through adapter 62, into suction port 75 and mixed into the base flow 72 within chamber 70. The mixed solution creates a final concentration solution flow 76 through outlet 73 and into receiving container 30 via dispensing tube 28.

Figure 5:
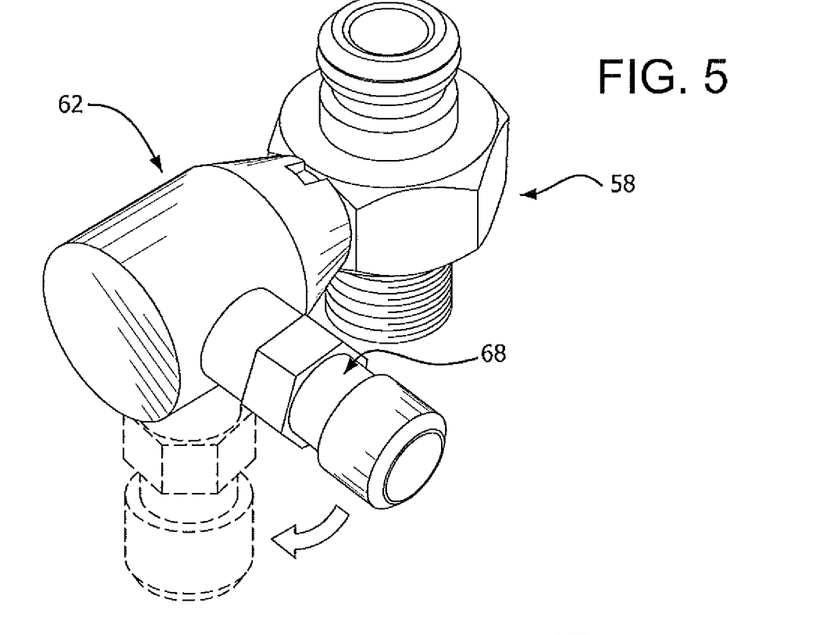
FIG. 5 is a perspective view illustrating an exemplary locking mechanism for attachment of the line adapter to the injector arm of the injector assembly, in accordance with the present invention.
Figure 6:
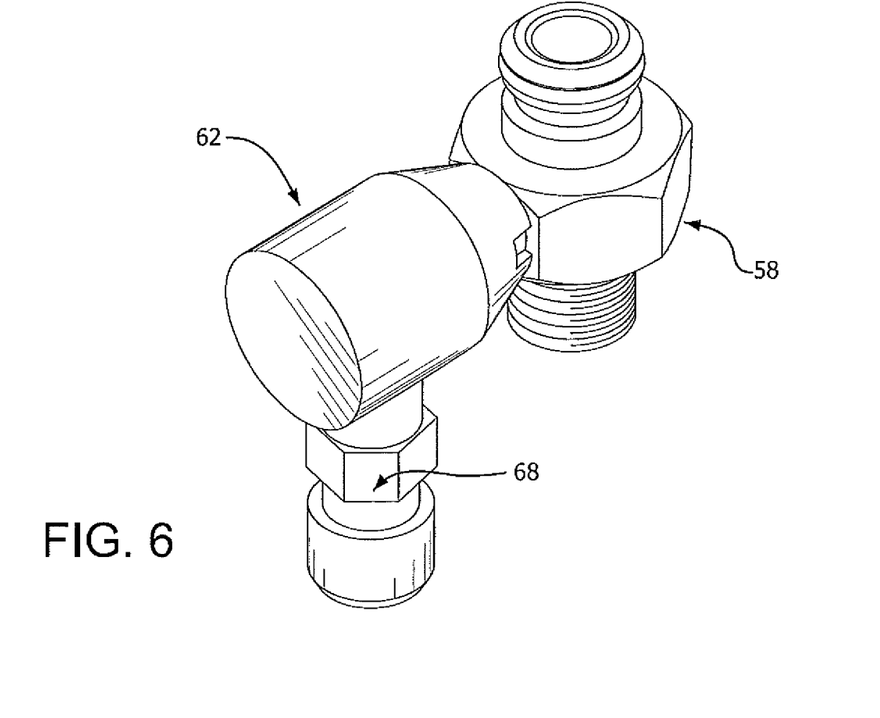
FIG. 6 is a perspective view of the injector assembly of FIG. 5 in the locked position, in accordance with the present invention.

To ensure secure attachment of adapter 62 to injector arm 59, adapter 62 is uniquely designed to include an attachment portion 64, such that adapter 62 can be securely (and releasably attached to injector 58 by pressing attachment portion 64 over injector arm 59 and twisting the adapter to lock adapter 62 in place via a locking mechanism. For example, as illustrated in FIGS. 5 and 6, attachment portion 64 includes notch pattern 63 that is sized and shaped to receive knob patter 57 of injector arm 59, such that the adapter head 65 slides over the injector arm knobs until the knobs clear the wall ring (from which the notches are cut) within adapter portion 64. Upon twisting adapter 62, the injector arm knobs rotate away from the notches and lock the adapter in place. To remove the adapter 62 from the injector arm, the adapter is twisted to once again align the notches with the injector arm knobs, thus permitting the knobs to slide through the notches when the adapter is pulled away from the injector arm. In some embodiments, an additional fitting 60 may be included to help seal the adapter 62 to the injector arm. In such embodiments, the fitting 60 may also help create a tighter seal, and thereby permit better draw of the chemical components through the internal chamber of adapter 62 into and through the injector arm and venturi chamber.

The present invention provides for automatic mixing of the various components within the system, such that no additional mixing steps of the final solution mixture are needed. This feature is made possible through the venturi combined with a mixing and vacuum ring.

Additionally, it was discovered that the ideal pressure for the creation of high concentration mixes from super concentrates is different than when making an application level mix from a regular concentrate. For example, existing systems use pressures in a range from 150 to 250 psi, and even upwards of 1000 psi. Surprisingly, it was found that a much lower operating pressure, such as between about 20-40 psi, is optimal for creation of concentrated solution mixes from super concentrates. In one embodiment, the pressure within a mixing station is less than 150 psi. In another embodiment, the pressure is less than 100 psi. In yet another embodiment, the pressure is less than 60 psi. In still other embodiments, the pressure is in a range of between about 2-50 psi, between about 5-40 psi, between about 10-30 psi, between about 15-25 psi, and any whole or partial increments therebetween. This lower pressure range also reduces the cost of the pump, the hazards of working around a high pressure machine, improves the mixing environment, and reduces the difficulties of dispensing a chemical solution into a container, such as the reduction of foaming.

The arrangement of the present invention allows for independent adjustment of the pressure for each of the dilution venturis of each mixing station. To accomplish this each mixing station includes a pressure regulator to ensure that the desired flow rate of base fluid through the venturi occurs, as this flow rate can be used to optimize the suction of super concentrated chemical components, thereby optimizing the flow rate of each such chemical component to create accurate concentrations and/or mixture ratios within the final concentrated solution mix.

The present invention utilizes preset venturis for ease of use by operators to arrive at various qualities and settings of final solution mixes without a thorough understanding of the process. For example, the venturis can be pre-set to manufacture any number and variety of detergents and other concentrated chemical products, as well as allow them to make a range of qualities within that product range, simply by employing a predetermined set of dilution arrangements.

According to another aspect of the present invention, the flow rate of any particular chemical component can be controlled as desired in the creation of the desired mixed solution. Such control provides the ability to create different mixed solutions having variable proportions of one or more chemical components. For example, the present invention utilizes the viscosities of the various chemical components to create the proper ratio of chemical components within the mix.

The present invention also includes a method of tip "balancing" for further controlling the draw of at least one chemical component, resulting in a controlled blending of the multiple chemical components through a multiport injector. For example, a metering tip of variable orifice size is placed in the tube just prior to the venturi, which restricts the draw of the component passing through the metering tip, and thereby increasing the amount of other components in the final solution mix. In other words, the component drawn through a tube having a metering tip in it will be drawn into the venturi at a slower rate than a component drawn though a line without a metering tip. The effects of such metering tips can be seen in Table 1:

TABLE 1

Water Test ml/gal

| Tip color (orifice diameter) | ml | % change |
|---|---|---|
| No Tip | 1332 | — |
| Gray/0.128 in | 1277 | −4% |
| Black/0.098 in | 1215 | −5% |
| Beige/0.07 in | 1061 | −13% |
| Red/0.052 in | 837 | −21% |
| White/0.043 in | 691 | −17% |
| Blue/0.04 in | 608 | −12% |

Other restrictors may optionally be used within dispensing line 28, to cause a liquid backup to more quickly fill a discharge region within injector assembly 22, speeding up a vacuum in the injector and thereby avoiding or reducing an initial uneven draw of one or more chemical components. Such a liquid backup may thus prevent or reduce cavitation and permit injector 58 to evenly draw the various chemical components from containers 24 as desired after valve 18 is re-opened. Consequently, use of these restrictors also provides a better mixing environment as the resulting concentrated solution is dispensed into container 30.

As contemplated herein, the turbulence of the final solution flow into receiving tank 30 as dispensed from injector assembly 22 is also controlled by maintaining a preferred pressure range within mixing apparatus 10, so as to provide proper mixing of the resulting solution.

The present invention also relates to a method for mixing a concentrated chemical solution. The method comprises the steps of receiving a base fluid flow into a mixing station having an injector assembly that includes at least one venturi chamber having at least one suction port in fluid communication with the at least one venturi chamber, regulating the pressure of the base fluid flow to less than 150 psi, providing a source of at least one liquid chemical component in fluid communication with the injector assembly via a first tube, providing a receiving container for collection of the final concentrated chemical solution that is in fluid communication with the injector assembly via a second tube, mixing the at least one chemical component with the base fluid in the at least one venturi chamber to create the concentrated chemical solution, wherein flow of the base fluid through the at least one venturi chamber of the injector assembly draws the at least one liquid chemical component through the at least one suction port and into the flow of the base fluid, and dispensing the concentrated chemical solution into the receiving container. As contemplated herein, the methods of mixing concentrated chemical solutions according to the present invention can be performed using the mixing apparatus described hereinthroughout, including all such described embodiments, and the steps necessary for the implementation of such embodiments.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1

Determination of Optimal Pressure Ranges

For creation of higher concentrated solution mixes from super concentrates, a highly controlled and delicate mixing environment is needed. Part of this mixing environment includes control of pressure and flow rate of the base fluid through the venturis. It was initially found that use of standard pressure ranges for similar systems (150-250 psi) proved ineffective, and a much lower pressure range was required. Thus, experiments for determining the optimal pressure ranges for mixing concentrated solutions were performed.

Figure 8:
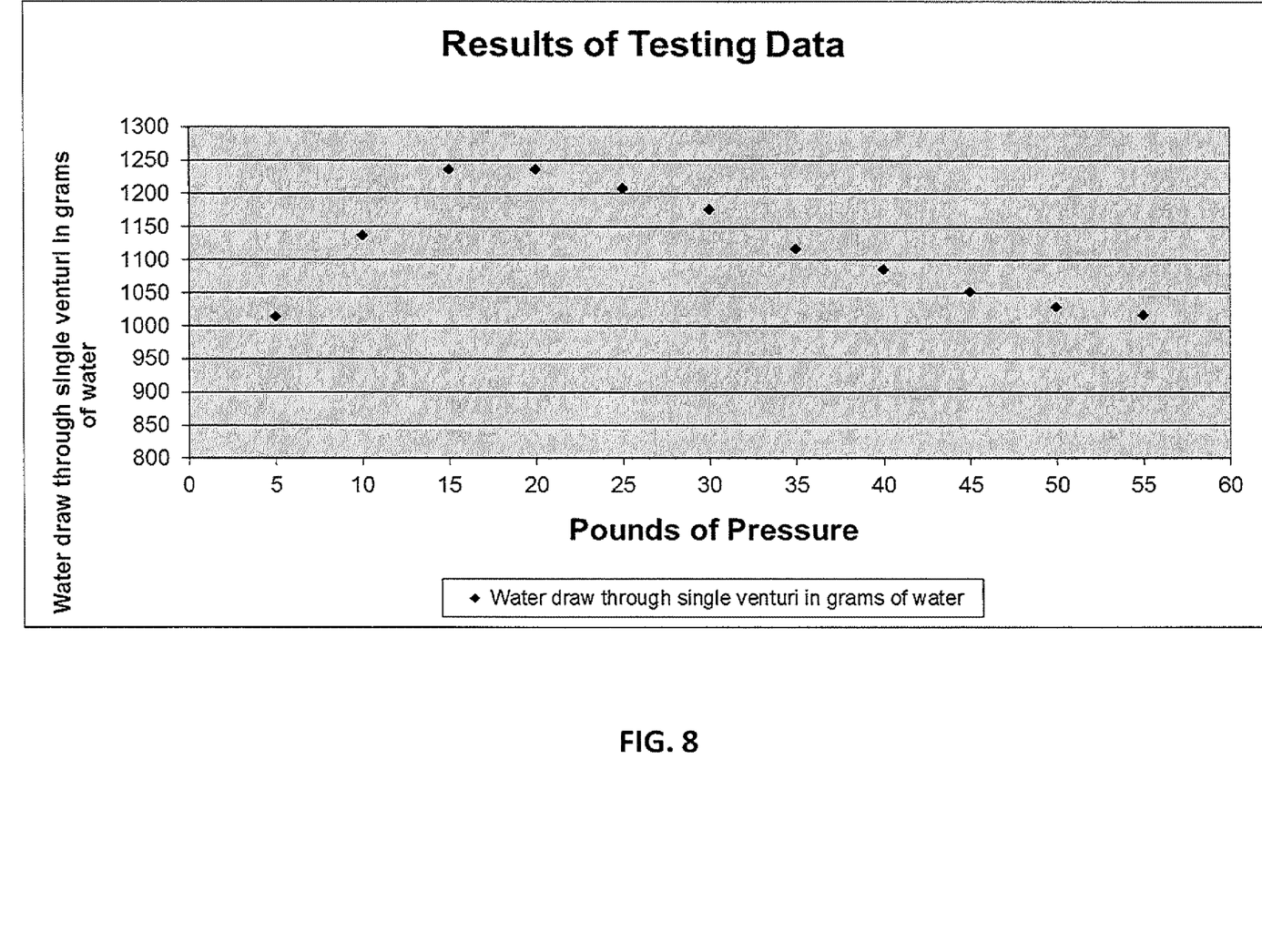
FIG. 8 is a chart of the amount of water (grams) drawn through the venturi of a 0.083 injector at various pressures.

Using the mixing apparatus of the present invention, the following results (Table 2) were obtained using a 0.083 injector and charted as shown in FIG. 8.

TABLE 2

| pressure (psi) | water draw through single venturi (g) |
|---|---|
| 5 | 1013 |
| 10 | 1137 |
| 15 | 1236 |
| 20 | 1236 |
| 25 | 1207 |
| 30 | 1176 |
| 35 | 1117 |
| 40 | 1086 |
| 45 | 1052 |
| 50 | 1028 |
| 55 | 1016 |

Additionally, the following results listed in Table 3 were obtained using a 0.098 injector:

TABLE 3

| pressure (psi) | water draw through single venturi (g) |
|---|---|
| 25 | 1146 |
| 35 | 1075 |

The following results listed in Table 4 were obtained using a 0.086 injector:

TABLE 4

| pressure (psi) | water draw through single venturi (g) |
|---|---|
| 25 | 1140 |
| 35 | 1077 |

This data demonstrates that the optimal pressure for maximum water draw is between about 15-20 psi. Further, this data also demonstrates that a 0.083 injector provides for better performance over different sized injectors (0.086 and 0.098). However, because filling times are shortened at higher pressures, a pressure in the range between about 25-30 psi provides for both improved water draw and shorter filling times (fill time at 30 psi is approximately half that of 15 psi). It should be appreciated that the present invention may utilize these features to customize the mixing apparatus to produce the desired type and speed of solution mixture. For example, if maximum efficiency is desired, the system can operate at a pressure between about 15-20 psi. If increased speed is desired, a pressure in the range of 20-50 psi can be used. Generally speaking, the higher the concentration level of the final solution mixture, pressure in the range of about 15-20 psi should be used. In some instances, a very high concentrate solution mix can only be created when pressure is within the 15-20 psi range. It should be appreciated that the mixing apparatus, as described herein, can operate at any pressure between about 5-100 psi. Pressures higher than 100 psi are generally only suitable for use-level solution mixtures that are not concentrated.

Testing on the creation of multiple products at one time was performed. Water pressure was monitored, which drives the ratio of the dilution. Four injectors were set at 25 psi and the apparatus was activated without a pump. The pressure at the first mixing station was 25 psi, pressure at the second station dropped to 22 psi, pressure at the third station dropped to 20 psi and pressure at the fourth station dropped to 15 lbs. When the same tests were performed with inclusion of a pump set to maintain pressure and flow over all four mixing stations, the pressure was indeed steady at 25 psi for each station.

Example 2

Improvement of Chemical Flow Via Larger Tubing

Experiments for evaluating the effect of larger tubing for use in drawing chemical components into the injector assembly were performed. A 10 foot section of standard ½ inch hose was used to feed an injector capable of 1:6 chemical to water solution concentrations. It was found that 7398 ml of a solvent was pulled into an untipped venturi in creation of a 5 gallon solution. Surprisingly, when using the same setup having a 10 foot section of standard ¼ inch hose feeding the very same venturi creating a 5 gallon solution, only 3900 ml of solvent was pulled. Thus, the use of at least a ½ inch feed line into the base fluid flow within the venturi chamber results in a dramatic and significant increase in chemical component draw. This feature permits a user the ability to utilize lower system pressure, and consequently produce higher concentrated solution mixes.

Example 3

Improved Mixing of Concentrated Solutions

Experiments for evaluating chemical component mixing were performed, and it was found that instability existed within certain formulas upon standard lab mixing, as compared to the mixing function of the present invention. In effect, mixing of increased concentration solutions was significantly improved by use of the mixing apparatus of the present invention in comparison to standard mixing techniques. For example, drying agents Total Car Protectant (TCP) and Clear Coat Protectant (CCP) (produced and sold by Blendco Systems, LLC of Bristol, Pa.) were combined with water at recommended chemical to water ratios of approximately 1:2. When these mixtures were shaken by hand and then stored at room temperature, 40° F. or 120° F., there was haziness and or separation in the solution mix, which is a sign of solution instability. However, when the same mixture was prepared with the mixing apparatus of the present invention, the samples where clear and homogenous after storage at room temp, 40° F. and 120° F. The combination of multi part injection, the mixing from the water, the mixing through the mix ring and the mixing into the receiving container, and some contribution from air into the mix, can each be controlled to result in a stable, final concentrated solution mix.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A method for mixing a concentrated liquid chemical detergent solution for use with a car wash application-level delivery system, comprising:
   receiving a base fluid into a mixing station having an injector assembly that includes at least one venturi chamber having at least one suction port in fluid communication with the at least one venturi chamber;
   regulating the pressure of the base fluid to less than 40 psi;
   providing a source of at least one super concentrate liquid chemical detergent component in fluid communication with the injector assembly via a first tube;
   providing a receiving container for collection of a final concentrated liquid chemical detergent solution that is in fluid communication with the injector assembly via a second tube;
   mixing the at least one super concentrate liquid chemical detergent component with the base fluid in the at least one venturi chamber to create a concentrated liquid chemical detergent solution, wherein a flow of the base fluid through the at least one venturi chamber of the injector assembly draws the at least one super concentrate liquid chemical detergent component through the at least one suction port and into the flow of the base fluid; and
   dispensing the concentrated liquid chemical detergent solution into the receiving container, wherein the dispensed concentrated liquid chemical detergent solution is suitable for use with the car wash application-level delivery system to produce an application-level dilution of the chemical detergent component.

2. The method f claim 1, wherein the pressure is regulated between 5-35 psi.

3. The method of claim 1, wherein the pressure is regulated between 10-25 psi.

4. The method of claim 1, further comprising pressurizing the base fluid.

5. The method of claim 1, wherein the injector assembly includes a multi-port injector.

6. The method of claim 1, further comprising reducing the resistance area of the first tube by increasing the diameter of the first tube.

7. The method of claim 6, further comprising at least partially restricting the flow of the at least one super concentrate liquid chemical detergent component flowing into the injector assembly with a metering tip.

8. The method of claim 1, wherein the pressure is regulated between 15-20 psi.

9. The method of claim 1, wherein the first tube is ½ inch tubing.

10. The method of claim 9, wherein the ½ inch tubing is connected to an adapter for releasably securing the ½ inch tubing to the at least one suction port of the at least one venturi chamber.

11. The method of claim 1, further comprising termination of the flow of the base fluid to the mixing station when the receiving container is filled with a predetermined amount of the concentrated solution mixture dispensed from the injector assembly.

12. The method of claim 11, wherein termination of the flow of the base fluid is actuated by a float positioned at least partially within the receiving container.

13. The method of claim 1, wherein the concentrated solution has a total chemical to water concentration of equal to or greater than 1:5.

14. The method of claim 1, wherein the application level dilution has a total chemical to water concentration of no greater than 1:20.

15. The method of claim 1, wherein the concentrated solution has a total chemical to water concentration of equal to or greater than 1:5, and wherein the application level dilution has a total chemical to water concentration of no greater than 1:20.

* * * * *